March 28, 1950     D. H. PRUTTON     2,501,738
MACHINE STRUCTURE

Filed April 9, 1945     3 Sheets-Sheet 1

INVENTOR.
DANIEL H PRUTTON.
BY Hyde and Meyer.
ATTORNEYS.

March 28, 1950  D. H. PRUTTON  2,501,738
MACHINE STRUCTURE

Filed April 9, 1945  3 Sheets-Sheet 2

INVENTOR.
DANIEL H. PRUTTON.
BY Hyde and Meyer
ATTORNYS.

March 28, 1950  D. H. PRUTTON  2,501,738
MACHINE STRUCTURE

Filed April 9, 1945  3 Sheets-Sheet 3

INVENTOR.
DANIEL H. PRUTTON.
BY Hyde and Meyer
ATTORNEYS.

Patented Mar. 28, 1950

2,501,738

UNITED STATES PATENT OFFICE 2,501,738

MACHINE STRUCTURE

Daniel H. Prutton, Cleveland, Ohio

Application April 9, 1945, Serial No. 587,398

4 Claims. (Cl. 10—136)

The invention relates to automatic controls for movable machine tools. It particularly relates to controls for movable tools which perform operations within certain limits of lineal tool travel, and to safety features for the protection of the various relatively movable parts.

Those skilled in the mechanical arts are familiar with the fact that, for example, drilling, boring, reaming, tapping, or similar machine operations involve relative travel between the tool and the work, and that it is frequently desirable to limit the tool travel to a certain depth of penetration, or lineal extent of travel.

It is further evident that when such operations are being performed on a machine, and at such speed or in such position that they are not practically responsive to manual control or visual inspection, an unexpected resistance encountered by the tool may result in damage to the tool, the work, or the machine.

It is also apparent that a sufficient supply of cutting oil must be available for many such machine operations, and it is quite desirable that delivery of oil be made in quantity restricted to only the needed amount, at the proper point, and under such conditions that the largest possible quantity of said oil may be recovered and recirculated for continuous use.

In view of these and kindred considerations, an object of the present invention is to provide automatic means for defining and limiting the path of movement of a machine tool, in combination with means for protecting the tool and the work when any abnormal resistance is offered to tool travel.

A further object of the invention is to dispose the location and operation of the work, the tool, and the delivery of cutting oil so that the oil may be efficiently delivered at or immediately ahead of the points of application of the cutting area or areas of the tool and may thereafter be substantially completely recovered for filtration and recirculation.

Other objects and advantages of the invention are either obvious, or will appear as the description proceeds.

While it will be immediately evident that the invention is applicable to use in a variety of machining, boring, metal cutting, or grinding operations, it will be herein illustrated and described in connection with a tapping operation of predetermined depth, it being understood that the present description and the accompanying drawings are entirely by way of example, and represent only one application of the invention.

In machine tapping operations as heretofore practiced where the work is done by a reversible tap, energization of the tap being usually accomplished by transmission of power through a periodically reversing clutch, an effort has been made to make this clutch drive sensitive enough to ordinarily transmit enough power to perform the necessary cutting operation, but to permit clutch slippage, or otherwise protect the tool, if undue resistance is encountered. Power transmission means involving a slipping clutch is usually inefficient, it being difficult to maintain the clutch at a critical point of adjustment. The application of power in my invention now to be described, is effected in a novel and most efficient manner, and, as will appear, sudden or abnormal resistance to advance of the tap is cushioned in a simple yet effective way.

It has likewise been customary to place the work on a bench or bed, and apply the tool from above, simultaneously feeding an oil supply downwardly, this practice usually resulting in the flooding of the work by excessive lubricant, so as to render an efficient oil recovery most difficult. As will appear, I have reversed the usual practice in this respect, since the work is placed above the tap, the cutting stroke is by an upward movement of a tool situated below the work, and the oil supply is directed inwardly and upwardly upon the cutting faces of the tap, being emitted only during the actual cutting stroke, and being limited to little more than a practically sufficient quantity, under the control of a valve which is in synchronism with the operation of the tap.

In the drawings, Fig. 1 is a side elevation, partly in section, and with parts broken away, showing several units of a tapping machine embodying my invention.

Figure 1:
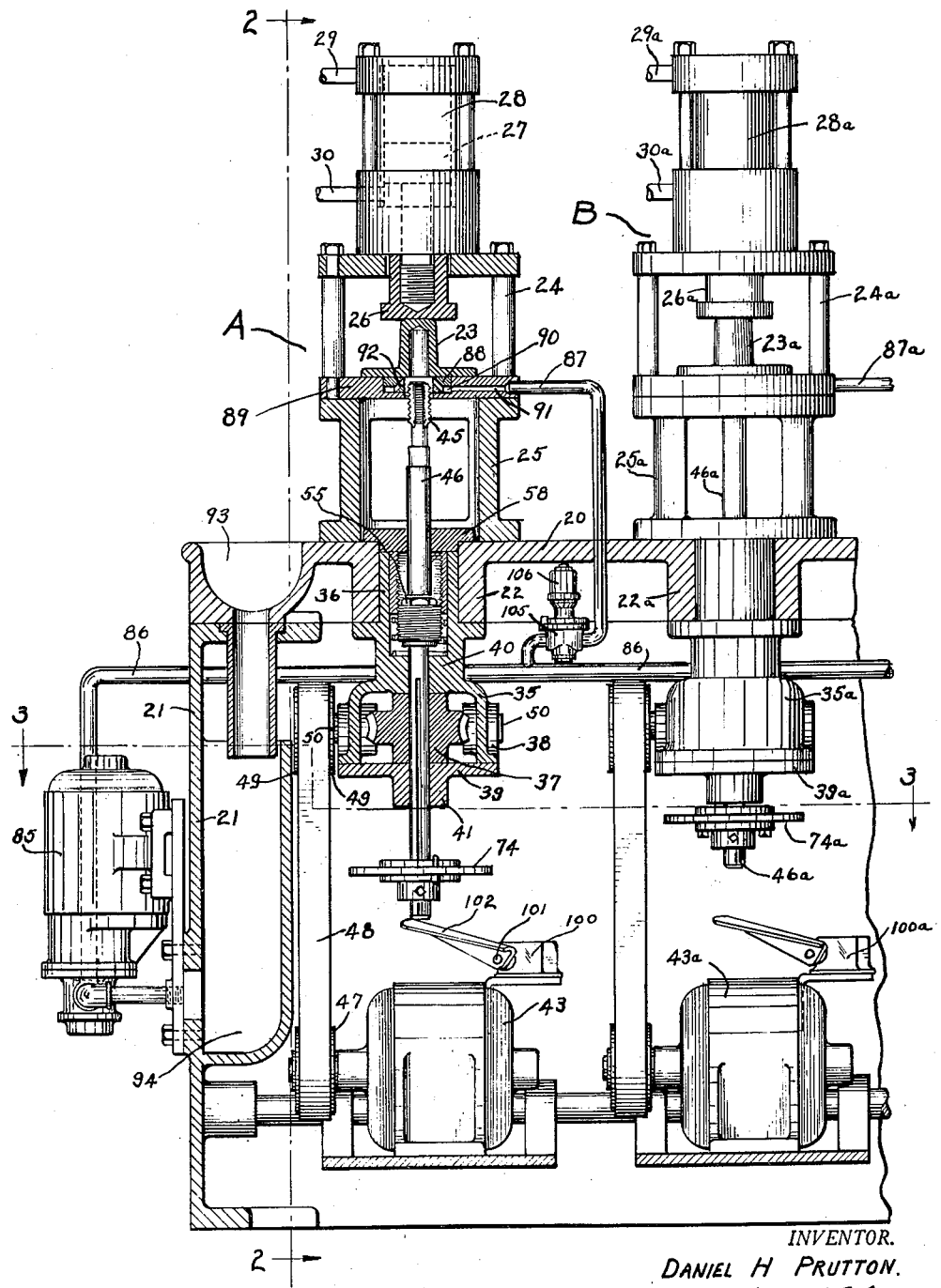

Referring now to the drawings, and particularly to Fig. 1, there is shown a tapping machine assembly comprising two complete units A and B, corresponding parts in unit B, being identified by the same reference numeral with the suffix "a". The units are carried on a bed 20 supported on legs or wall members 21. The bed is provided with spaced bosses 22, centrally apertured, which define the location of the respective tapping units. The work piece, here shown as a flanged thimble 23 is disposed in a centering jig 24 supported on a work table 25 which is carried on bed 20. The bed 20, the jig 24, and the thimble 23 are arranged concentrically with respect to the vertical axis of boss 22. The thimble is maintained in position in any suitable way, such as by a reciprocable ram 26 which is advanced and withdrawn by a piston 27 operating in a hydraulic cylinder 26 motivated by a fluid power supply through conduits 29 and 30. It will be obvious that the ram may be advanced or retracted either automatically at fixed times in the work cycle, or manually at any desired time, by control means not here shown, since this phase of the operation forms no part of the present invention.

The tapping mechanism and its manner of support and operation will now be described. Suspended from boss 22 is a gear housing 35 which has an upward annular extension 36 telescopingly fixed within boss 22. The housing carries a conventional worm and gear assembly 37, 38, and is closed by a bottom plate 39. A necked portion of the housing is centrally bored to provide an upper bearing 40, and the bottom plate has a lower bearing 41 in a boss in alignment with the aforesaid upper bearing 40.

Figure 4:
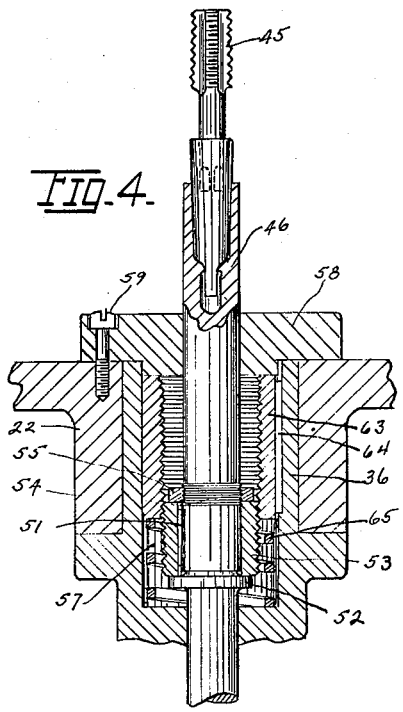
Figs. 4 and 5 are enlarged sectional views of fragmentary parts of the structure shown in Figs. 1 and 2.

A tap 45 is carried by the upper end of a spindle 46 (Figs. 1 and 4) which is rotatable and axially vertically movable in bearings 40 and 41. The spindle has a complementary key-and-slot connection with gear 37, whereby rotation of the gear effects rotation of the spindle, but the spindle is freely vertically slidable, either upwardly or downwardly, with respect to the gear, as will appear. The worm, gear, and spindle are driven from a three phase reversible motor 43 through a pulley 47, belt 48, pulley 49, and shaft 50, the worm 38 being affixed to shaft 50.

Vertical reciprocation of spindle 46 is effected as follows. An intermediate surface portion of the spindle (Fig. 4) is provided with a shoulder, here conveniently illustrated as an out turned flange 52 which supports thereon an externally threaded collar 53. The spindle is provided, in the neighborhood of the top surface of collar 53, with peripheral threads 54 adapted to receive a clamping nut 55 whereby the collar 53 is secured in place, the collar being also keyed to the spindle by key means 51. This portion of the spindle lies within the annular upward extension 36 of the gear housing 35. The top opening of the cylindrical aperture 57 thus provided is closed by a centrally bored cap 58 removably secured to the table 20 by machine screws 59.

An internally threaded sleeve 63 is telescopingly vertically slidable within aperture 57, rotational movement of the sleeve being prevented by a key 64 which seats in slots in members 63 and 36. Sleeve 63 is biased to its top position by a helical spring 65. The external threads on collar 53 match the internal threads on sleeve 63, and under normal conditions when spindle 46 is rotated the spindle and collar move upwardly or downwardly with respect to sleeve 63 which is maintained in fixed position by the spring 65. Conversely, however, if the spindle 46, and the collar 53 be rotated, while upward motion of the spindle is forcibly prevented or opposed in any way, then sleeve 63 will travel downwardly within aperture 57, against a steadily increasing resistance of spring 65. When motor 43, therefore, is causing rotation of spindle 46, if upward movement of the spindle is opposed by a greater force than that of the spring 65 as exerted on sleeve 63, the sleeve will begin to descend and as the resistance to its descent increases, a braking effect is applied through collar 53, to the spindle, and consequently to the driving gears and the motor 43.

The collar and sleeve constitute, respectively, a driving member and a driven member. When the tool is rotated by the motor, it energizes the collar which in turn becomes operatively effective upon the sleeve. Normally, while the tool is movable with relation to the sleeve, the sleeve is maintained in position, and the driving member therefore expends its driving force in displacing itself endwise, but, as already indicated, when unexpected resistance is encountered, the driving member is blocked, and it thereupon produces displacement of the driven member. When and if such condition is encountered, the motor labors and slows down, and the situation becomes apparent to the operator who may reverse the motor, cut the power off, or otherwise initiate steps to remedy the trouble.

In normal operation of the apparatus as just described, the complementary threads on sleeve 63 and collar 53 will be identical in pitch with the threads on tap 45. This is obvious, since in making one rotation on its axis, the spindle advances an amount determined by the aforesaid complementary threads, and the tap must necessarily rotate and advance in identical fashion. Consequently, if the thread to be formed in the work is to be changed, a suitable sleeve and collar must be substituted within aperture 57, having complementary interfitting threads identical with those of the new tap.

The normal operating extent of upward and downward movement of spindle 46 is controlled in the following manner. A reversing switch 70 is fixed adjacent the lower end of the spindle (Fig. 2), and is here shown as attached to the bottom plate 39 of the gear housing 35. The switch is operated by alternative clockwise or counter-clockwise rotation of a control shaft 71 to which are affixed upper and lower triggers 72 and 73 respectively. The spindle 46 carries a disc 74 (Fig. 5) having upper and lower fingers 75 and 76, respectively. When the rotating disc 74 moves upwardly, carried by the spindle, and reaches the point where finger 75 strikes trigger 72, it throws shaft 71 through a rotary arc and operation of switch 70 reverses the direction of rotation of motor 43 as will be later more evident in connection with the description of the wiring diagram. It likewise throws trigger 73 to a point where it lies in the path of rotation of finger 76 which now begins to descend with the spindle. When the spindle descends to the point where finger 76 strikes trigger 73 the switch position is reversed, motor 43 again reverses, the spindle 46 again ascends, and the cyclic operation thus continues.

Figure 3:
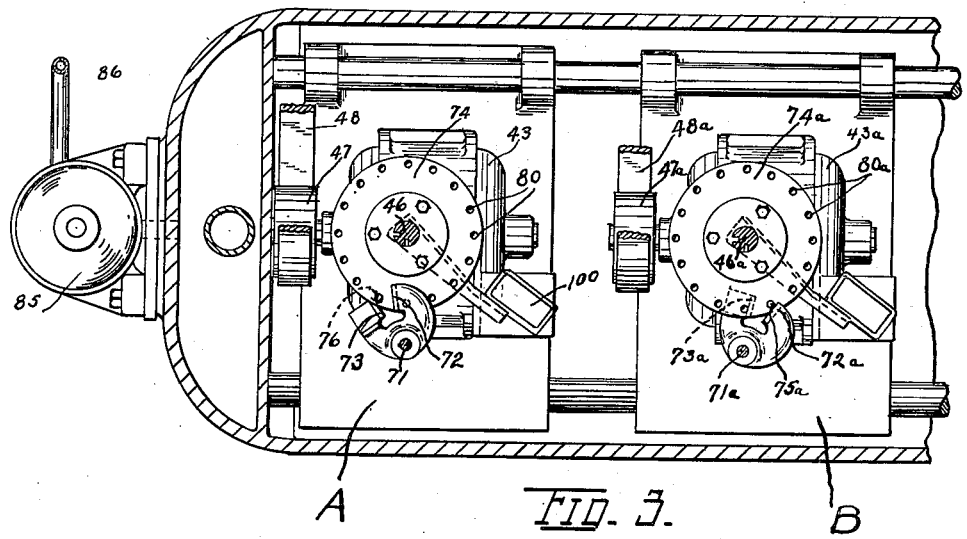
Fig. 3 is a sectional view taken on the line 3—3 of Fig. 1.

In the sectional view, Fig. 3, the spindle 46 of unit A is arriving at the lower end of its normal path of reciprocatory travel, and the finger 76 on the lower face of disk 74 is just striking trigger 73 to throw it counter-clockwise, thereby reversing switch 70 and initiating upward motion of the spindle. In the same view, the corresponding spindle 46a of unit B is near the upper end of its path of travel, and the finger 75a on the upper face of disk 74a is just striking trigger 72a to throw it clockwise and reverse its switch 70a to initiate downward travel of the spindle 46a.

It will be apparent that as spindle 46 descends, the tap clears the plane of the lowermost point of the thimble 23 which may then be released by causing withdrawal of ram 26 automatically or otherwise. The span of downward travel of the spindle is predetermined in such manner, by suitable spacing of fingers 72 an 73, that sufficient interval elapses before return of the tap to permit removal of a finished thimble and replacement of another. As a matter of fact an experienced operator may attend two or more units, whose operations are properly staggered. No injury occurs, of course, if through some inadvertence a thimble is left in place after a tapping operation, since on the next cycle the tap merely returns through the previously tapped aperture, and only a loss of time results.

Figure 5:
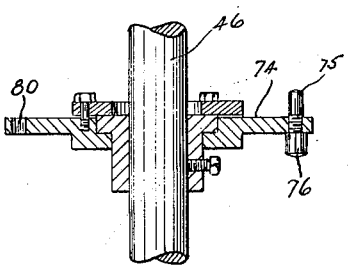

Since the vertical distance between triggers 72 and 73 determines the span of vertical reciprocation of spindle 46, this span may be increased or diminished by increasing the distance between triggers, for instance by raising or lowering trigger 73, which is accomplished by manipulation of adjusting screws 78 which travel in slots (not shown) in the supporting bracket 79. The disk 74 is provided with a series of peripherally spaced apertures 80 (Figs. 3 and 5), in any suitable one of which the fingers 75, 76 may be seated. As indicated in Fig. 5, fingers 75 and 76 may be part of a single stud which has a threaded engagement with the aperture 80, and which has upper and lower protruding ends serving as fingers to operate respectively triggers 72 and 73.

A safety stop or limit switch 100 has been provided to establish a lower limit of travel for the spindle, and prevent collar 53 from disengaging itself from the lower end of sleeve 63.

Figure 2:
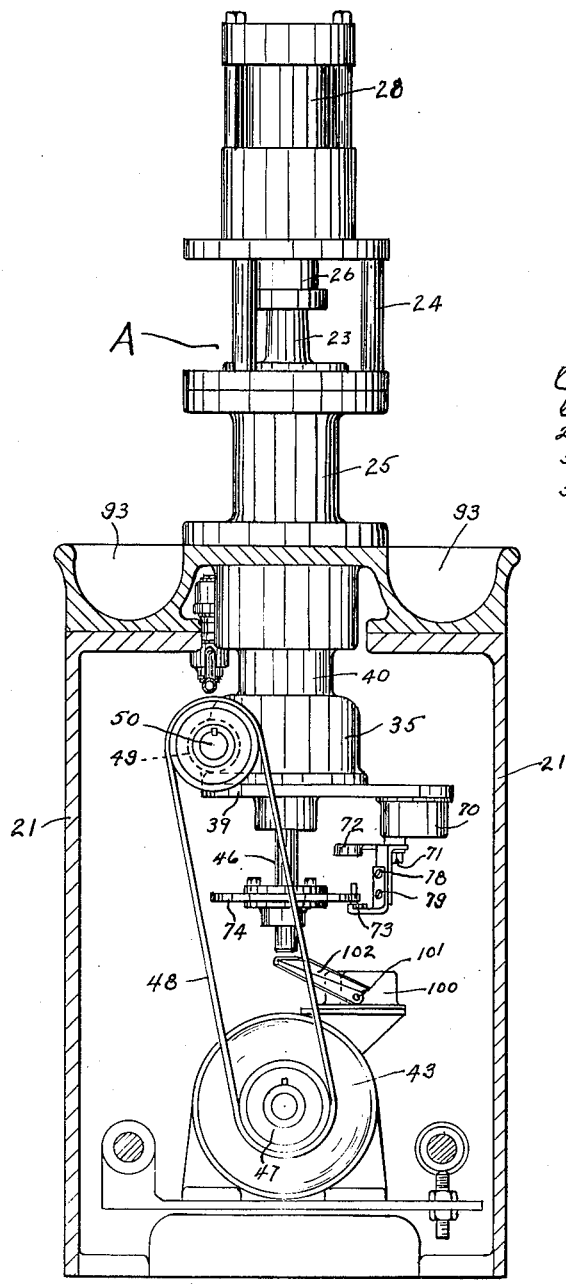
Fig. 2 is a sectional view taken on the line 2—2 of Fig. 1.

Switch 100 is shown in Figs. 1 and 2 as affixed by suitable bracket means to the housing of motor 43. The switch is operated by a shaft 101 to which is affixed an operating lever 102, the end of which lies in the path of travel of the lower end of spindle 46, but somewhat below the lower normal operating limit of the spindle. If for any reason the reversing switch 70 is not properly operated, the spindle runs below its normal path, and its lower end depresses lever 102, rotating shaft 101, and thereby cutting current to motor 43. As will soon be apparent, in connection with a description of the electrical circuits, the machine will not operate until the trouble is eliminated, and the reverse connections for the motor are properly re-established.

A motor and oil pump assembly 85 supplies cutting lubricant to the taps through a main conduit 86 and branch conduits 87. Immediately beneath thimble 23 is an oiling ring 88 seated in a suitable countersunk recess in the lower plate 89 of jig 24. Ring 88 is suitably rabbeted, or otherwise grooved, to provide an annular recess 90 which is in communication with branch conduit 87 through a bored passage 91 in plate 89. When oil is forced into recess 90 it discharges inwardly and upwardly through a series of inclined passages 92 spaced radially around the oil ring 88, and impinges directly on the cutting faces of the tap immediately at their zone of entry to the tapping area. After use the oil runs downwardly, and in great part is diverted to an oil drain 93, and thence to a sump 94 adjacent the inlet to the oil recirculation point.

A conventional solenoid-controlled oil valve 105 (Fig. 1) is provided for each tapping unit so that cutting oil may be discharged to each tap only when the tap is performing its cutting stroke. Its operation will become apparent in connection with the description of the electrical circuits.

A manual push button switch 107 is provided to interrupt a tapping cycle and return the tap to its lowest position, unless the spindle is already on its downward stroke, in which case the operation is not interrupted. The operation of this switch will likewise be evident in connection with the description of the wiring diagram. It may be fixed at any point convenient to the operator's hand, and is shown only in Fig. 6.

Figure 6:
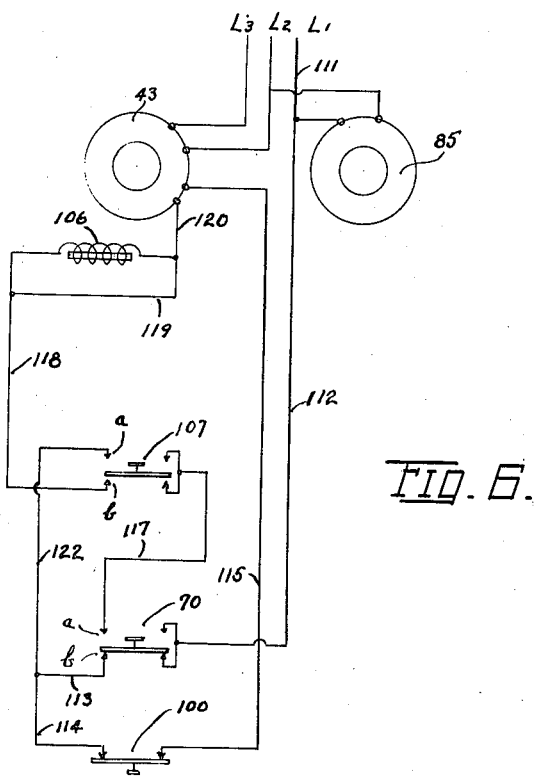
Fig. 6 is a diagrammatic view of the electrical circuits for the power application and control.

Referring now to Fig. 6, switch numbered 70 is the cycle reversing switch operated by the trip fingers on disk 74, and is a double throw, double pole switch having two positions, herein indicated for convenience as the "a" and "b" position, and so indicated in the drawing.

Switch 100 is the safety limit switch operated by the lower end of spindle 46, and is biased to normally closed position.

Switch 107 is the manual reversing switch, operated as desired by the workman, but only effective during upward travel of the spindle. It is a double pole, double throw switch, having opposed positions herein designated as a and b.

The solenoid coil for the oil valve 105 is indicated in Fig. 6 by reference character 106, and is connected in shunt with the circuit for upward travel of the spindle 46, as will appear.

With all switches in the position shown, the motor 43 is running in a direction appropriate to produce downward motion of the spindle, by means of the following circuit; from L1, through conductors 111 and 112, reversing switch 70 in b position, conductors 113 and 114, switch 100 in closed position, conductor 115, through the appropriate windings of motor 43 to produce downward spindle travel, and thereafter to lines L2 and L3 of the three phase line.

When the spindle reaches the position wherein finger 76 strikes trigger 73, reversing switch 70 is thrown to its a position, whereupon the circuit is established as follows; from L1 through conductors 111 and 112, switch 70 in a position, conductor 117, manual switch 107 in b position, conductors 118, 119 and 120, through the appropriate windings of motor 43 to produce upward movement of the spindle, and thereafter to L2 and L3. Solenoid coil 106 is in shunt with conductor 119, and is energized to operate valve 105 and admit oil to the tap as hereinbefore described.

When the spindle reaches its upper limit, reversing switch 70 is again thrown to b position, and the motor is again reversed to initiate a new cycle.

Assuming that the spindle is traveling upwardly, and that switch 70 is in a position as already described, manual switch 107 may be thrown from its b or normal position to its a position so as to produce reversal of the motor and downward travel of the spindle, as follows. The current now proceeds from L1 through conductors 111 and 112, switch 70 in a position, conductor 117, manual switch 107 in a position, conductors 122 and 114, switch 100 in its closed position, and conductor 115 to the appropriate motor wirings to produce downward movement of the spindle, thereby interrupting its upward travel, and accelerating completion of the cycle, although of course leaving a tapping operation incomplete.

It will be noted that limit switch 100 is in the circuit energized for downward spindle movement, and it will be obvious, as heretofore mentioned, that if the bottom end of the spindle opens switch 100 by striking lever 102 (Figs. 1 and 2), current to the motor 43 will be interrupted until the condition be corrected which permitted the spindle to run past its normal limit of travel. A similar manually operatable switch may be included, say in conductor 111 or 112, and situated near the operator's hand, for immediate stoppage of the motor 43 in emergencies. Such result of course could likewise be accomplished by opening a main line switch controlling all three lines, but not here shown.

The motor 85 for the oil pump may be a single phase motor shunted across L1 and L2 as indicated, so that it runs constantly as long as the main line connection is established. The oil delivery to the taps is of course controlled by the oil valves 105, of which there is an individual valve for each unit, which valve in turn is operated by its respective solenoid 106, as heretofore described.

Only a single operating diagram has been shown in Fig. 6, although two tapping units, A and B, are illustrated in Figs. 1 and 3. It will be immediately apparent to anyone skilled in the electrical arts, that each tapping unit requires its individual control circuits, and that the diagram shown may be duplicated, or otherwise suitably modified to take care of the operation of each additional unit added to the production line. The drawings show a separate driving motor for each unit. Only one oil pump is required to maintain oil pressure for a plurality of units, each unit being serviced by its individual branch conduit, and each branch conduit being under the control of its respective solenoid-controlled oil valve.

The tapping machine herein shown and described is merely one embodiment of the inventive concept, it being apparent to those skilled in the art that the advantageous and novel features herein disclosed may be incorporated in other machines wherein there is relative movement between a tool and an article, and where it is desirable or necessary to provide against the harmful effects of sudden stoppage, or resistance encountered by the traveling element. As a further feature, I have here shown a novel disposition of the tool with respect to the article, and an advantageous and economical structure for application of the oil to the tool. I have further shown novel and useful means for controlling the direction and extent of the tool travel, and also additional safety means for absolutely limiting its said travel if the first said means fails to function.

What I claim is:

1. Apparatus for performing a tapping operation on an article, said operation being confined within dimensional limits in an aperture in said article, said apparatus comprising means for holding said article in fixed position, a tap, and supporting means for said tap including a tap-carrying spindle, power means operatively associated with said spindle for advancing said spindle and tap towards said aperture and retracting it therefrom while simultaneously rotating said spindle and tap around a lineal axis, means for supplying cutting fluid to said tap during that portion of the operation in which the tap is being advanced, a pair of fingers carried by said spindle, and rotatable and otherwise movable therewith, reversing means for said power means, trigger means operatively associated with said reversing means and disposed in the path of travel of said fingers, and responsive to contact, alternately, with each said finger, whereby to actuate said reversing means in respectively opposed directions, in turn, whereupon, at each such contact, the direction of rotation and of axial travel of said spindle and said tap is thereby reversed.

2. Apparatus for performing a tapping operation in a previously bored aperture in an article, comprising a frame, article holding means carried by said frame for holding said article in such position that said aperture opens downwardly, a tap, tap supporting means carried by said frame and disposed below said article holding means, means carried by said frame and operatively engaging said tap supporting means for advancing retracting, and rotating said tap, and oil supplying means automatically effective only on upward travel of the tap to supply cutting oil to the tap, and automatically effective only on downward travel of the tap to terminate the oil supply.

3. Apparatus for performing on an article a tapping operation to be confined within dimensional limits in an aperture in said article, said apparatus comprising a frame, article holding means carried by said frame for holding said article in fixed position, a tap, tap supporting means including a tap carrying spindle supported on said frame, power means operatively engaging said spindle and adapted to successively advance said spindle axially towards said aperture and retract it therefrom while simultaneously rotating said spindle, finger means carried by said spindle and rotatable and otherwise movable therewith, power reversing means, and trigger means operatively associated with said power means and disposed in the path of travel of said finger means, and responsive to contact therewith whereby to actuate said reversing means upon each such contact, and power de-energizing means situated beyond the normal path of travel of said spindle, but disposed to be operatively engaged by said spindle should said spindle inadvertently overrun said normal path of travel whereby, upon such operative engagement, said power means is de-energized, and a safety limit point is thereby established for spindle travel.

4. Apparatus for performing on an article a tapping operation to be confined within dimensional limits in an aperture in said article, said apparatus comprising a frame, article holding means carried by said frame for holding said article in fixed position, a tap, tap supporting means including a tap carrying spindle supported on said frame, power means operatively engaging said spindle and adapted to successively advance said spindle axially towards said aperture and retract it therefrom, while simultaneously rotating said spindle, finger means carried by said spindle and rotatable and otherwise movable therewith, power reversing means, and trigger means operatively associated with said power means and disposed in the path of travel of said finger means, and responsive to contact therewith whereby to actuate said reversing means upon each such contact, cutting fluid supply means disposed beneath said article holding means for supplying cutting fluid to said tap, means automatically terminating the supply of cutting fluid during retraction of said tap, and power de-energizing means situated beyond the normal path of travel of said spindle, but disposed to be operatively engaged by said spindle should said spindle inadvertently overrun said normal path of travel whereby, upon such operative engagement, said power means is de-energized, and a safety limit point is thereby established for spindle travel.

DANIEL H. PRUTTON.

REFERENCES CITED

The following references are of record in the file of this patent:

UNITED STATES PATENTS

| Number | Name | Date |
|---|---|---|
| 604,447 | Weiss | May 24, 1898 |
| 954,490 | Young | Apr. 13, 1910 |
| 1,177,382 | Meloon | Apr. 4, 1916 |
| 1,236,414 | Eden | Aug. 14, 1917 |
| 1,398,338 | Mirrielees | Nov. 29, 1921 |
| 1,480,495 | Bessler | Jan. 8, 1924 |
| 1,970,218 | Bishop et al. | Aug. 14, 1934 |
| 1,991,927 | Herrmann et al. | Feb. 19, 1935 |
| 2,084,022 | Frank | June 15, 1937 |
| 2,244,925 | Tyne | June 10, 1941 |
| 2,250,349 | Berquist | July 22, 1941 |
| 2,253,493 | Bakewell | Aug. 26, 1941 |
| 2,254,032 | Fisher | Aug. 26, 1941 |
| 2,254,281 | Grey | Sept. 2, 1941 |
| 2,346,297 | Garbe | Apr. 11, 1944 |
| 2,368,359 | Hellstrom | Jan. 30, 1945 |